United States Patent
Muharemovic et al.

(10) Patent No.: US 8,218,663 B2
(45) Date of Patent: Jul. 10, 2012

(54) REFERENCE SIGNAL RESOURCE ALLOCATION FOR SINGLE USER MIMO

(75) Inventors: Tarik Muharemovic, Dallas, TX (US); Eko N. Onggosanusi, Allen, TX (US); Runhua Chen, Plano, TX (US); Zukang Shen, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 287 days.

(21) Appl. No.: 12/511,011

(22) Filed: Jul. 28, 2009

(65) Prior Publication Data

US 2010/0034312 A1      Feb. 11, 2010

Related U.S. Application Data

(60) Provisional application No. 61/084,357, filed on Jul. 29, 2008, provisional application No. 61/086,902, filed on Aug. 7, 2008.

(51) Int. Cl.
*H04K 1/10* (2006.01)
*H04L 27/28* (2006.01)
(52) U.S. Cl. .................................. 375/260; 375/295
(58) Field of Classification Search .......... 375/259–260, 375/267, 295–296, 299, 285
See application file for complete search history.

(56) References Cited

U.S. PATENT DOCUMENTS

| | | | | |
|---|---|---|---|---|
| 7,720,161 B1* | 5/2010 | Dogan et al. | | 375/259 |
| 7,852,883 B2* | 12/2010 | Kwak et al. | | 370/522 |
| 7,852,959 B2* | 12/2010 | Kwak et al. | | 375/260 |
| 2006/0068698 A1* | 3/2006 | Sandhu et al. | | 455/1 |
| 2008/0139237 A1* | 6/2008 | Papasakellariou | | 455/522 |
| 2008/0310531 A1* | 12/2008 | Bai et al. | | 375/260 |
| 2009/0034505 A1* | 2/2009 | Papasakellariou et al. | | 370/344 |
| 2009/0046646 A1* | 2/2009 | Cho et al. | | 370/329 |
| 2009/0196240 A1* | 8/2009 | Frederiksen et al. | | 370/329 |
| 2009/0249027 A1* | 10/2009 | Kim et al. | | 712/5 |

OTHER PUBLICATIONS

3GPP, "3rd Generation Partnership Project; Technical Specification Group Radio Access Network; Evolved Universal Terrestrial Radio Access (E-UTRA); Physical Channels and Modulation", 3GPP TS 36.211, Release 8, V8.4.0, Valbonne, France, Sep. 2008, pp. 1-80.
3GPP, "3rd Generation Partnership Project; Technical Specification Group Radio Access Network; Evolved Universal Terrestrial Radio Access (E-UTRA); Multiplexing and Channel Coding", 3GPP TS 36.212, Release 8, V8.4.0, Valbonne, France, Sep. 2008, pp. 1-56.

(Continued)

*Primary Examiner* — Jean B Corrielus
(74) *Attorney, Agent, or Firm* — Ronald O. Neerings; Wade James Brady, III; Frederick J. Telecky, Jr.

(57) ABSTRACT

Transmission with multiple antennas in a wireless network is performed by transmitting a plurality of reference sequences (RS) from a UE. A first RS $s1[k]$ is produced using a first cyclic shift and a base sequence $s0[k]$, wherein $k=\{1, 2 \ldots K\}$ is an element index. A second RS $s2[k]$ is produced using a second cyclic shift and $s0[k]$. A first symbol sequence $x1[k]$ is produced using at least $s1[k]$ and $s2[k]$, for at least one k. A second symbol sequence $x2[k]$ is produced using at least $s1[k]$ and $s2[k]$, for at least one k. $x1[k]$ is transmitted using a first transmit antenna and $x2[k]$ is transmitted using a second transmit antenna.

20 Claims, 7 Drawing Sheets

OTHER PUBLICATIONS

3GPP, "3rd Generation Partnership Project; Technical Specification Group Radio Access Network; Evolved Universal Terrestrial Radio Access (E-UTRA); Physical Layer Procedures", 3GPP TS 36.213, Release 8, V8.4.0, Valbonne, France, Sep. 2008, pp. 1-60.

3GPP, "3rd Generation Partnership Project; Technical Specification Group Radio Access Network; Evolved Universal Terrestrial Radio Access (E-UTRA); Physical Layer Aspects", 3GPP TS 36.814, Release 9, V1.2.01, Valbonne, France, Jun. 2009, pp. 1-49.

* cited by examiner

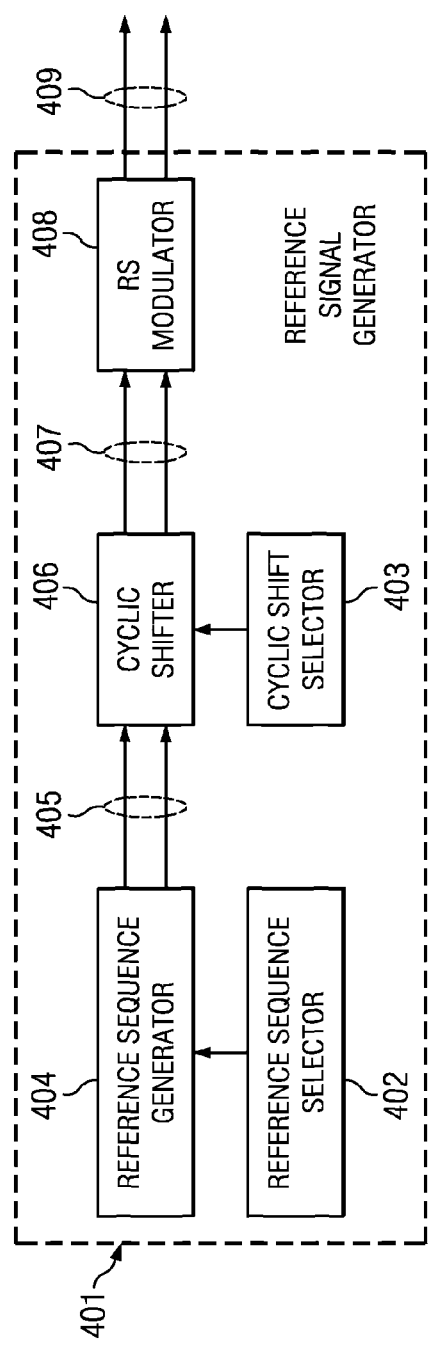
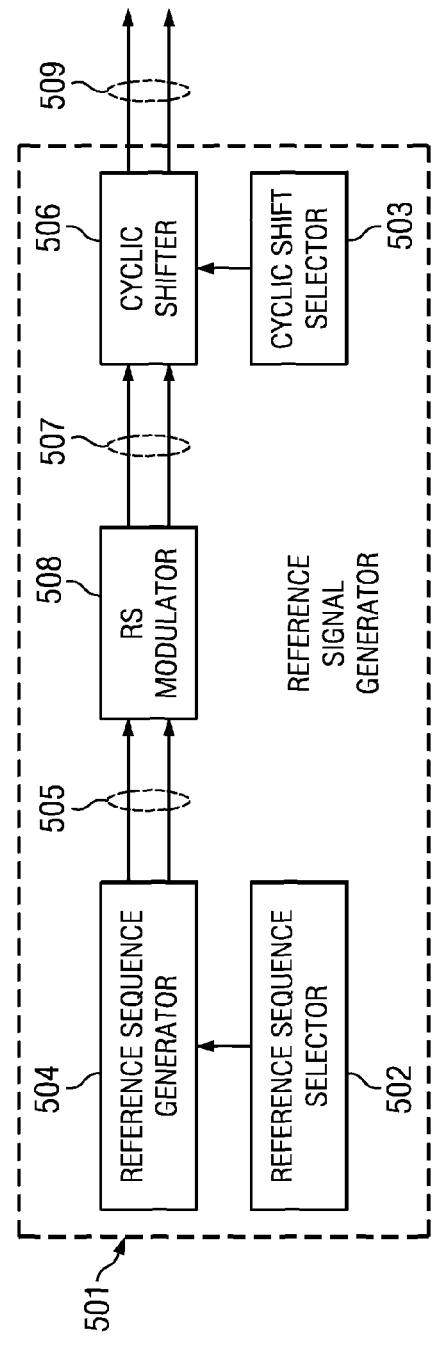

MULTIPLE DMRS SIGNALS

REFERENCE SIGNAL RESOURCE ALLOCATION FOR SINGLE USER MIMO

CLAIM TO PRIORITY AND CROSS-REFERENCE TO RELATED APPLICATIONS

The present application claims priority to and incorporates by reference U.S. provisional application No. 61/084,357 filed on Jul. 29, 2008, entitled "Reference Signal Resource Allocation for SU-MIMO in the Uplink." The present application claims priority to and incorporates by reference U.S. provisional application No. 61/086,902 filed on Aug. 7, 2008, entitled "Reference Signal Resource Allocation for SU-MIMO in the Uplink."

FIELD OF THE INVENTION

This invention generally relates to wireless cellular communication, and in particular to multiple input multiple output (MIMO) transmission in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can be portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Long Term Evolution (LTE) wireless networks, also known as Evolved Universal Terrestrial Radio Access (E-UTRA), are being standardized by the 3GPP working groups (WG). OFDMA and SC-FDMA (single carrier FDMA) access schemes were chosen for the down-link (DL) and up-link (UL) of E-UTRA, respectively. User Equipments (UE's) are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station provides back some allocated UL resource and timing advance information to allow the UE to transmit on the PUSCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (TS 36.211 Release 8, or later)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DMRS. Note that RS can also be transmitted for other purposes, such as channel sounding (SRS), synchronization, or any other purpose. Also note that Reference Signal (RS) can be sometimes called the pilot signal, or the training signal, or any other equivalent term.

The LTE PHY can optionally exploit multiple transceivers at both the base station and UE in order to enhance link robustness and increase data rates for the LTE downlink. Spatial diversity can be used to provide diversity against fading. In particular, maximal ratio combining (MRC) is used to enhance link reliability in challenging propagating conditions when signal strength is low and multipath conditions are challenging. Transmit diversity can be used to improve signal quality by transmitting the same data from multiple antennas to the receiver. Spatial multiplexing can be used to increase system capacity by carrying multiple data streams simultaneously from multiple antennas on the same frequency. Spatial multiplexing may be performed with one of the following cyclic delay diversity (CDD) precoding methods: zero-delay, small-delay, or large-delay CDD. Spatial multiplexing may also be referred to as MIMO (multiple input multiple output).

With MRC, a signal is received via two (or more) separate antenna/transceiver pairs. The antennas are physically separated, and therefore have distinct channel impulse responses. Channel compensation is applied to each received signal within the baseband processor before being linearly combined to create a single composite received signal. When combined in this manner, the received signals add coherently within the baseband processor. However, the thermal noise from each transceiver is uncorrelated, resulting in improved signal to noise ratio (SNR). MRC enhances link reliability, but it does not increase the nominal system data rate since data is transmitted by a single antenna and is processed at the receiver via two or more receivers. MRC is therefore a form of receiver diversity rather than more conventional antenna diversity.

MIMO, on the other hand, does increase system data rates. This is achieved by using multiple antennas on both the transmitting and receiving ends. In order to successfully receive a MIMO transmission, the receiver must determine the channel impulse response from each transmitting antenna. In LTE, channel impulse responses are determined by sequentially transmitting known reference signals from each transmitting antenna. While one transmitter antenna is sending the reference signal, the other antenna is idle. Once the channel impulse responses are known, data can be transmitted from both antennas simultaneously. The linear combination of the two data streams at the two receiver antennas results in a set of two equations and two unknowns, which is resolvable into the two original data streams.

Three different types of physical channels are defined for the LTE downlink. One common characteristic of physical channels is that they all convey information from higher layers in the LTE stack. This is in contrast to physical signals, which convey information that is used exclusively within the PHY layer. Currently, the LTE DL physical channels are as follows: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), and Physical Hybrid ARQ Indicator Channel (PHICH).

Physical channels are mapped to specific transport channels. Transport channels are SAPs for higher layers. Each physical channel has defined algorithms for bit scrambling, modulation, layer mapping, CDD precoding, and resource element assignment. Layer mapping and precoding are related to MIMO applications. Basically, a layer corresponds to a spatial multiplexing channel. Channel rank can vary from one up to the minimum of number of transmit and receive antennas. For example, given a 4×2 system, i.e., a system having four transmit antennas and two receive antennas, the maximum channel rank is two. The channel rank associated with a particular connection varies in time and frequency as the fast fading alters the channel coefficients. Moreover, the channel rank determines how many layers, also referred to as the transmission rank, can be successfully transmitted simultaneously. For example, if the channel rank is one at the instant of the transmission of two layers, there is a strong likelihood that the two signals corresponding to the two layers will interfere so much that both of the layers are erroneously detected at the receiver. In conjunction with precoding, adapting the transmission to the channel rank involves striving to use as many layers as the channel rank. The precoding applied for the demodulation reference signal (DMRS) is the same as the one applied for the PUSCH. Cyclic shift separation is the primary multiplexing scheme of the demodulation reference signals.

The baseline for sounding reference signal in LTE-Advanced operation is non-precoded and antenna-specific. For multiplexing of the sounding reference signals, Rel-8 or later principles are reused.

MIMO systems are defined in terms of M-transmitters×N-receivers. For LTE, defined configurations are M=1, 2, and 4 while the value of N is not specified. When M>N, there is redundancy on at least one of the data streams. layer mapping specifies exactly how the extra transmitter antennas are employed.

Precoding is also used in conjunction with spatial multiplexing. MIMO exploits multipath to resolve independent spatial data streams. In other words, MIMO systems require a certain degree of multipath for reliable operation. In a noise-limited environment with low multipath distortion, MIMO systems can actually become impaired. The basic principle involved in precoding is to mix and s distribute the modulation symbols over the antennas while potentially also taking the current channel conditions into account. Precoding can be implemented by, for example, multiplying the information carrying symbol vector containing modulation symbols by a matrix which is selected to match the channel based on a certain selection criterion. Some examples of selection criterion include average throughput and maximum signal-to-interference-noise ratio (SINR). Sequences of symbol vectors thus form a set of parallel symbol streams and each such symbol stream is referred to as a "layer". Thus, depending on the choice of precoder in a particular implementation, a layer may directly correspond to a certain physical antenna or a layer may, via the precoder mapping, be distrubuted onto several physical antennas.

Cyclic delay diversity (CDD) is a form of open-loop precoding in which the precoding matrix is intentionally varied over the frequency within the transmission (or system) bandwidthy. Typically, this is realized by introducing different cyclic time delay for the different antennas, or alternatively realized by varying the phase of the transmitted signals from the different antennas. This kind of phase shift means that the effective channel, comprising the true channel and the CDD precoding, varies faster over frequency than the original channel. By distributing the transmission over frequency, this kind of artificially induced frequency-selectivity may be useful in achieving frequency diversity.

Control information feedback bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACK-NAK or just simply ACK, or any other equivalent term. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

Channel quality indicator (CQI) needs to be fed back in uplink (UL) to support dynamic scheduling and multiple-input-multiple-output (MIMO) transmission on downlink (DL). In 3GPP EUTRA, if a UE (user equipment) has no uplink data transmission, its CQI is transmitted on a dedicated UL control channel (i.e. PUCCH). For example, MIMO related feedback information includes: index of a selected precoding matrix (PMI); transmission rank, which is the number of spatial transmission layers; and supportable modulation and coding schemes (MCS). Otherwise, the corresponding CQI is transmitted together with the UL data by multiplexing the CQI with the UL data in the physical uplink shared channel (PUSCH).

BRIEF DESCRIPTION OF THE DRAWINGS

Particular embodiments in accordance with the invention will now be described, by way of example only, and with reference to the accompanying drawings:

FIG. 4 is a diagram of an example Reference Signal Generator.

FIG. 5 is a diagram of another example Reference Signal Generator.

DETAILED DESCRIPTION OF EMBODIMENTS OF THE INVENTION

In order to enable SU-MIMO transmission, in some embodiments of the invention, a UE can be assigned more than one (e.g. a group) of DMRS resources. In some embodiments, a DMRS resource is obtained from a cyclic shift of a base signal. The number of cyclic shifts used is signaled to the UE. In some embodiments of the invention, a UE uses a group of evenly spaced cyclic shifts. In some embodiments of the invention, a NodeB signals only one cyclic shift to the UE and the remaining cyclic shifts are computed at the UE using the single signaled cyclic shift. In other embodiments, all cyclic shifts which are assigned to the UE are signaled explicitly in the downlink signaling. Thus, in some embodiments of the invention, reference signal resources are cyclic shifts.

In some embodiments of the invention, the DMRS is pre-coded by one pre-coder and data transmission is pre-coded by another pre-coder. In some embodiments of the invention, both pre-coders are the same. In some embodiments of the invention, the pre-coders are different. Further, in some embodiments, the DMRS is not pre-coded and the data transmission is pre-coded.

Various embodiments which allow the support of single-user MIMO without introducing a new scheme and signaling support will now be described herein that fully reuses the existing spatial multiplexing scheme that is defined for adaptive precoding. The disclosed embodiments of the invention are applicable to various wireless networks, including Evolved Universal Terrestrial Radio Access Network (E-UTRAN). The disclosed embodiments include methods and apparatus for transmitting and receiving MIMO signals.

Figure 1:
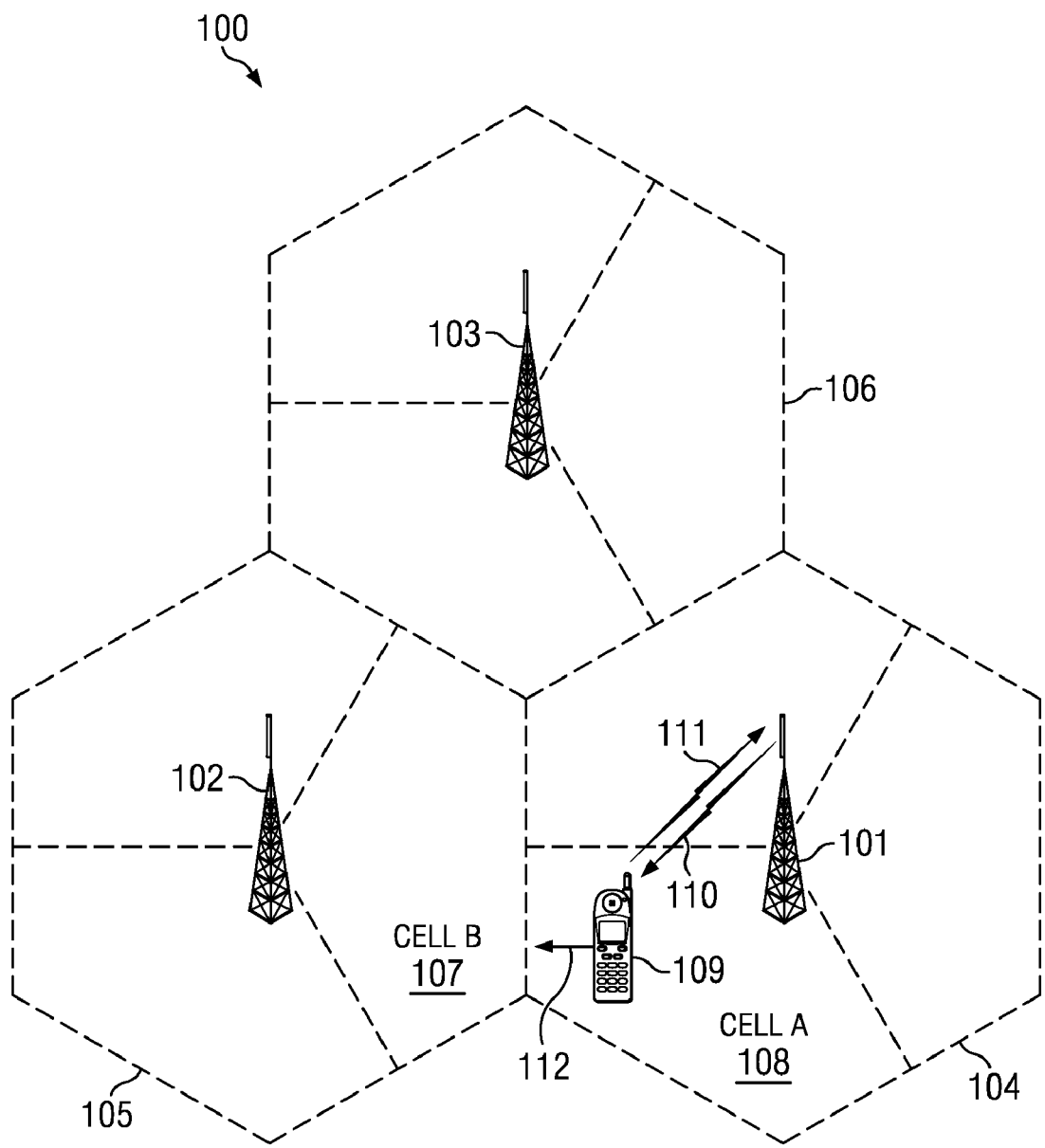
FIG. 1 is a pictorial of an illustrative telecommunications network that supports transmission of reference signal allocation for single user MIMO.

FIG. 1 shows an illustrative wireless telecommunications network 100 that supports transmission and reception of OL SM signals, as described in more detail below. The illustrative telecommunications network includes base stations 101, 102, and 103, though in operation, a telecommunications network may include more base stations or fewer base stations. Each of base stations 101, 102, and 103 is operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be "handed over" to base station 102. Assuming that UE 109 is synchronized with base station 101, UE 109 likely employs non-synchronized random access to initiate handover to base station 102. The distance over which a random access signal is recognizable by base station 101 is a factor in determining cell size.

When UE 109 is not up-link synchronized with base station 101, non-synchronized UE 109 employs non-synchronous random access (NSRA) to request allocation of up-link 111 time or frequency or code resources. If UE 109 has data ready for transmission, for example, traffic data, measurements report, tracking area update, etc., UE 109 can transmit a random access signal on up-link 111 to base station 101. The random access signal notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by base station 101, UE 109 may adjust its transmit timing, to bring the UE 109 into synchronization with base station 101, and transmit the data on up-link 111 employing the allotted resources during the prescribed time interval. While transmitting in MIMO mode, formation of DMRS for each antenna according to various embodiments of the invention will be described in more detail below.

Once the UE is synchronized, the eNB may send data on DL in MIMO mode. UE 109 is traveling in a direction with a ground speed as indicated by 112. The direction and ground speed results in a speed component that is relative to serving eNodeB 101. Due to this relative speed of UE moving toward or away from its serving eNodeB a Doppler shift occurs in the signals being transmitted from the UE to the eNodeB resulting in a frequency shift and/or frequency spread that is speed dependent. In order to minimize problems with closed loop precoding selection due to stale channel estimates, the eNB may elect to operate in either an adaptive precoding manner or in a fixed precoding manner based on a selection criterion. Such selection criterion may involve UE velocity which may be inferred based on Doppler measurements, as well as some other factors such as the inter-cell interference condition (e.g. its burstiness). As an example, fixed precoding is selected for use above a certain velocity while adaptive precoding is selected for use below the certain velocity.

Figure 2:
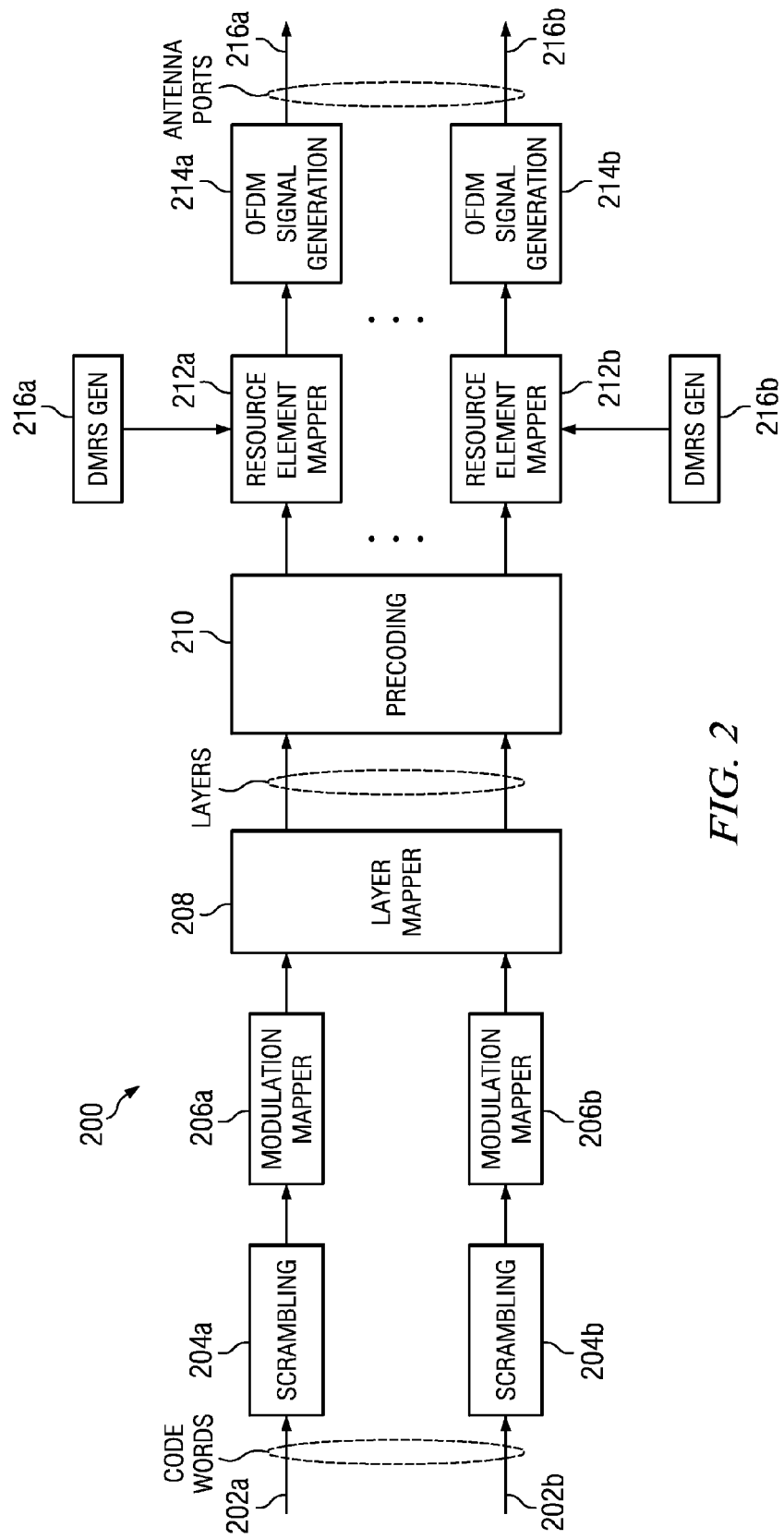
FIG. 2 is a block diagram of an illustrative transmitter for transmission of a MIMO signal in the network of FIG. 1 according to an embodiment of the invention.

FIG. 2 is a block diagram of an illustrative transmitter 200 for transmission of a MIMO signal. A baseband signal representing an uplink physical channel is formed by providing a stream of code words 202a, b to scrambling logic 204a, b. In this embodiment, there are two transmission layers illustrated which are indicated by 202a and 202b, etc. Other embodiments may have additional layers.

Scrambling logic 204a, b scrambles the coded bits in each of the code words to be transmitted on a physical channel. The scrambled bits are then provided to modulation mapper logic 206a, b which maps the scrambled bits to modulation constellations to generate complex-valued modulation symbols. For example, the PUSCH may use one of the following modulation schemes: QPSK (quaternary phase shift keying), 16 QAM (quaternary amplitude modulation), or 64 QAM.

The modulated symbols are then provided to layer mapping logic 208 for mapping of the complex-valued modulation symbols onto one of several transmission layers. The number of layers v is less than or equal to the number of antenna ports P used for transmission of the physical channel. The resulting complex-valued modulation symbols on each layer are then precoded for transmission on the antenna ports as described in more detail above with reference to Table 1 and Table 2.

The complex-valued modulation symbols for each antenna port and the DMRS for each antennae are then mapped to resource elements in resource element mappers 212a, b. For each of the antenna ports used for transmission of the physical channel, the block of complex-valued symbols $y^{(p)}(0), \ldots, y^{(p)}(M_{symb}^{ap}-1)$ are be mapped in sequence starting with $y^{(p)}(0)$ to virtual resource blocks assigned for transmission. The mapping to resource elements (k,l) on antenna port p not reserved for other purposes are in increasing order of first the index k and then the index l, starting with the first slot in a subframe. DMRS generators 216a, b generate the DMRS, as will be described in more detail below.

The resource mapped symbols are then provided to OFDM signal generation logic 214a, b for the generation of complex-valued time-domain OFDM signals 216a, b for each antenna port.

The 3GPP E-UTRA system supports a competitive multi-input multi-output (MIMO) scheme which allows dynamic rank (the number of spatial layers) adaptation along with adaptive precoding for both 2- and 4-antenna systems. There are two precoding modes for the E-UTRA, as defined in 3GPP TS 36.211 V8.0.0, "Physical Channels and Modulation": precoded without CDD ("zero-delay" CDD) and precoded large-delay CDD.

Adaptive precoding is generally intended for low UE speed. For DL, adaptive precoding is enabled by a feedback called PMI (precoding matrix indicator) from the receiver (UE) to the transmitter (eNB). Due to the processing at the eNB and UE, there is some delay between the PMI and the time (subframe) where the eNB transmits using the recommended precoder. Hence, the delay makes the feedback more outdated (stale) as the UE speed increases. Also, PMI feedback is not sent every subframe which further contributes to the delay. In the E-UTRA system, PMI is transmitted together with CQI.

The same principle holds for UL multi-antenna transmission as well. Although there is no PMI feedback, the eNB estimates the channel from received signals such as the sounding reference signal (SRS), which is also periodically sent but not every subframe, thereby rendering the channel estimates stale.

In order to provide a suitable spatial multiplexing scheme for high UE speed to obtain the throughput gain of MIMO, an open-loop spatial multiplexing (OL SM) scheme is more suitable. Here, open-loop refers to the absence of adaptive precoding, not the absence of link adaptation. Furthermore, dynamic rank adaptation can still be supported between open-loop Tx diversity (OL TxD) and open-loop spatial multiplexing. The number of transmission layers is adapted based on a channel-dependent rank indicator feedback transmission.

The support of OL SM may require some additional signaling support (signaling tailored to OL SM) as well as the potential introduction of a new transmission mode on top the OL TxD. Note that there are numerous OL SM candidates, e.g. SM with linear dispersion code, higher rank extension of SFBC, large delay CDD with precoder cycling, etc. However, since the E-UTRA already includes a number of UE-mandatory schemes, introducing a new mode is undesirable from receiver development and testing perspective.

To support the operation at higher UE speed, either zero-delay or large-delay CDD mode can be used. In either case, the precoding matrix is fixed and not adapted. That is, the precoding matrix is fixed to be one of the matrices within the precoding codebook without any precoding adaptation. This does not introduce a new scheme as it is simply the existing precoded spatial multiplexing with one precoding matrix selected all the time. This can be accomplished without requiring any additional signaling support. The existing precoder subset restriction can be used (via higher layer signaling). Since a flexible bitmap approach is used to restrict the subset, the eNB can semi-statically restrict the precoder subset to one element for transmission ranks 2, 3, and 4. For rank-1, OL TxD is used so precoding is not used. The UE responds to the subset restriction by always selecting the corresponding precoding matrix for each rank. If necessary, a CQI feedback format that excludes PMI can be used. Alternatively, the original CQI feedback format (with PMI) may also be used if an additional CQI format is not desired.

While one matrix is sufficient for the purpose, it is also possible to perform fixed precoding by using a fixed subset of the precoding codebook that contains M precoding matrices where M>1. Since channel-dependent (adaptive) precoding is not performed, the precoding matrix is chosen alternately from the M matrices based on a pre-determined or a pseudo-random pattern. That is, the precoding matrix hops from one to another of the M matrices. Such precoding matrix hopping operation can be done across frequency sub-carriers, OFDM symbols, and/or subframes.

When the UE speed changes, the eNB can return to the normal (adaptive) precoded transmission. This can be done by changing the precoder subset restriction. Hence, the operation can be made transparent to the PHY layer, unless a separate no-PMI CQI feedback format is used for OL SM. Even if PMI is fed back to the eNB, the eNB does not need to read the PMI feedback from the UE. Alternative, a transmission mode configuration signal can also be used for the switching purpose.

As an example, consider the closed loop setup given in the 3GPP E-UTRA specification TS36.814 V1.2.1. For spatial multiplexed transmission with adaptive precoding on two antenna ports, $p \in \{0,1\}$, the precoding matrix W(i) corresponding to the i-th sub-carrier for zero and large-delay CDD may be selected from Table 1. In this case, an open-loop spatial multiplexing scheme can be obtained by selecting $W(i)=C_1$ for the two-layer transmission. Here, $C_1$ denotes the precoding matrix corresponding to precoder index 0 in Table 1.

TABLE 1

3-bit precoding codebook for uplink spatial multiplexing with two transmit antennas

| Codebook index | Number of layers v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | |
| 5 | $\frac{1}{\sqrt{2}}\begin{bmatrix}0\\1\end{bmatrix}$ | |

Figure 3A:
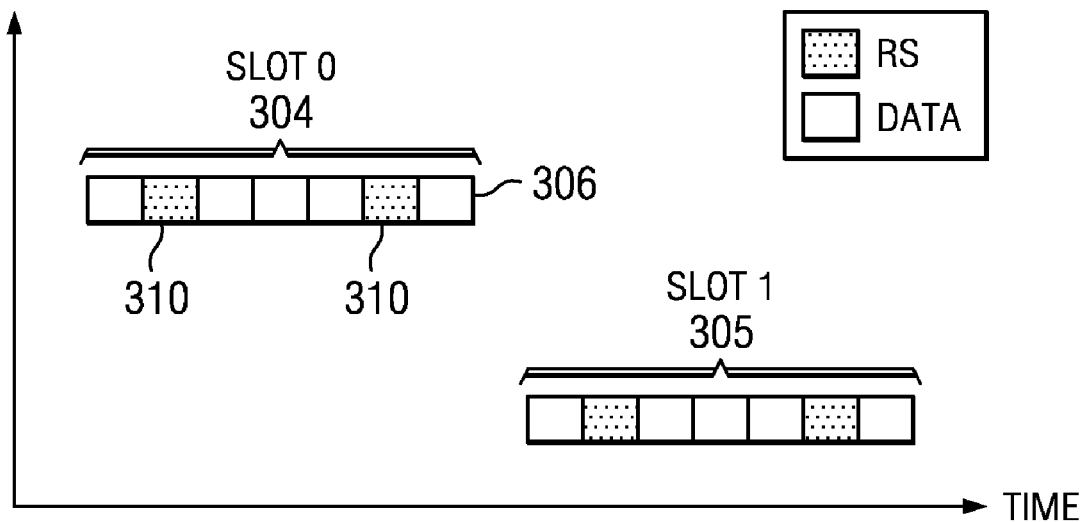
FIGS. 3A and 3B illustrate placement of reference signal symbols in a frame structure used for transmission within the network of FIG. 1.
Figure 3B:
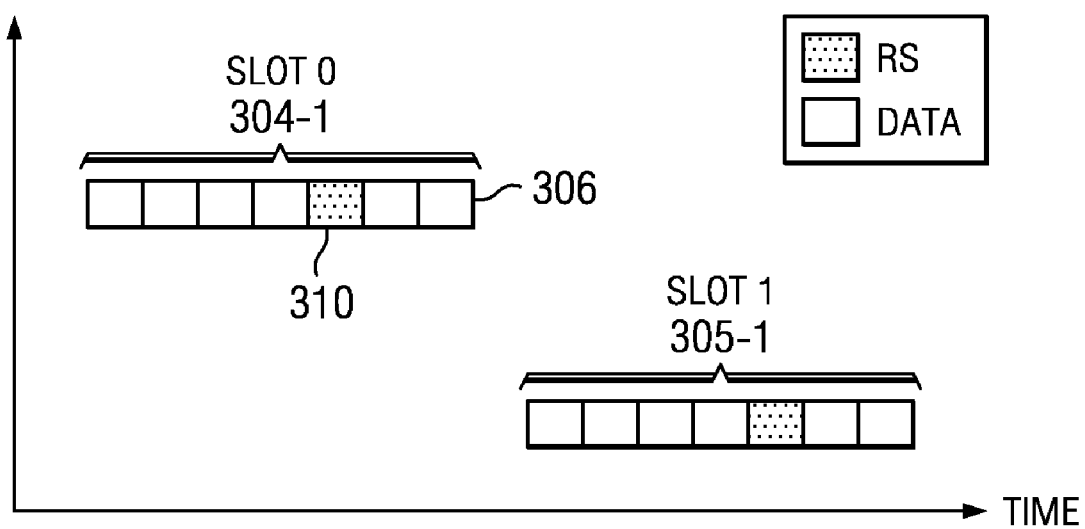

FIGS. 3A and 3B illustrate placement of reference signal symbols 310 in an exemplary frame structure used for transmission within the network of FIG. 1. Each frame contains several subframes. In turn, each subframe contains two slots 304, 305. Each slot contains a number of information carrying symbols, generally indicated at 306. A cyclic protection (CP) field is also appended to each symbol in order to improve reception integrity. In the current E-URTA standard, each slot contains seven symbols 306 if a normal CP length is used or six symbols 306 if an extended CP length is used. Other embodiments of the invention may provide other frame structures than the exemplary frame structure illustrated in FIGS. 3A-3B. FIG. 3A illustrates a subframe with two slots 304, 305 in the normal CP case. Two reference symbols (RS) 310 are included within each slot. FIG. 3B illustrates a subframe with two slots 304-1, 305-1 in the extended CP case. In this case, only one reference symbol 310 is included in each slot.

A reference signal is constructed using a reference signal sequence, typically by modulating a reference signal sequence. The reference signal sequence is known to both transmitter and receiver prior to any transmission. In some embodiments of the invention, a set of reference signal sequences includes CAZAC sequences and near-CAZAC sequences. Near-CAZAC is a term which designates sequences which are obtained using computer search methods, and whose properties approximate CAZAC properties. In some embodiments of the invention, CAZAC sequences are Zadoff-Chu sequences.

Zadoff-Chu (ZC) sequences, as defined by:

$$a_m(k) = \exp[j2\pi(m/N)[k(k+1)/2+qk]] \text{ for } N \text{ odd}$$

$$a_m(k) = \exp[j2\pi(m/N)[k^2/2+qk]] \text{ for } N \text{ even}$$

are representative examples of CAZAC sequences. An alternative convention of the ZC definition replaces "j" (complex unit) in the above formulas by "−j." Either convention can be adopted. For the representative CAZAC example, the formula was cited on page 53 from K. Fazel and S. Keiser, "Multi Carrier and Spread Spectrum Systems," John Wiley and Sons, 2003. In the above formula, "m" and "N" are relatively prime, and "q" is any fixed integer (for example, q=0 is a good choice, because it simplifies computation as qk=0). Also, "N" is the length of the sequence, "k" is the index of the sequence element (k is from $\{0, 1, \ldots, N-1\}$), and "m" is the index of the root ZC sequence. Making "N" a prime number maximizes the set of root ZC sequences having optimal cross-correlation. Thus, when "N" is prime, there are "(N−1)" possible choices for "m," where each choice results in a distinct root ZC CAZAC sequence. The terms: Zadoff-Chu, ZC, and ZC CAZAC, are commonly used interchangeably. The term CAZAC denotes any CAZAC sequence, like ZC, or otherwise.

In some embodiments of the invention, near-CAZAC sequences are sequences of the form $\exp(j*\pi*\phi(n)/4)$ where the length of $\phi(n)$ is an integral multiple of 12. Here, "j" is the imaginary unit.

TABLE 2

Exemplary definition of φ(n)

| U | φ(0), ..., φ(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |

TABLE 2-continued

Exemplary definition of φ(n)

| U | φ(0), ..., φ(11) | | | | | | | | | | | |
|---|---|---|---|---|---|---|---|---|---|---|---|---|
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

In some embodiments of the invention, the set of reference signal sequences includes CAZAC sequences only. In some embodiments of the invention, the set of reference signal sequences includes near-CAZAC sequences only. In some embodiments of the invention, the set of reference signal sequences includes both CAZAC sequences and near-CAZAC sequences. Suppose a near-CAZAC sequence is selected to be used for production of a reference signal. In order to produce the first sequence, the UE can apply operation $\exp(j*\pi*\phi(n)/4)$. Selection of phase sequence $\phi(n)$ can be made using Table 2 where there are 30 possible sequences of length 12. Sometimes, a phase ramp is applied to modify the first sequence, for example $\exp(j*n*\alpha+j*\pi*\phi(n)/4)$ can still be considered as a reference signal sequence. For 3GPP EUTRA, there are 30 possible sequences of length 24, which are also near-CAZAC. For length 36 and more, sequences are produced from CAZAC sequences. Thus, the set of reference signal sequences includes both CAZAC and near-CAZAC sequences.

Some embodiments of the present invention use two sets of sequences to create the reference signal. The distinction between the two sets is logical, meaning that some sequences from one set can be found in another and vice-versa. One set of sequences is called the "base set" and it consists of "base sequences." Another set is called the "covering set," and it includes sequences denoted as "covering sequences." In some embodiments of the invention, the "base set" is the "set of reference signal sequences." In such embodiments, these two terms can be used interchangeably.

FIG. 4 and FIG. 5 illustrate two example RS reference signal generators. In the example of FIG. 4, the Reference Signal Generator in 401 comprises a Reference Sequence Selector 402, a Reference Sequence Generator 404, a Cyclic Shift Selector 403, a Cyclic Shifter 406, and an RS Modulator 408. The example Reference Signal Generator 401 operates as follows. The Reference Sequence Selector 402 selects which Reference Sequence is to be transmitted, from one or more predefined, generated, computed and/or random sets of Reference Sequences. The Reference Sequence Selector 402 then configures the Reference Sequence Generator 404, which produces the Reference Sequence 405. In general, a Reference sequence (e.g. the Reference sequence 405) is comprised of one or more elements (e.g., samples, bits and/or values) that are transmitted during a reference signal time period. The Cyclic Shift Selector 403 selects which cyclic shift (if any) from one or more predefined, generated, computed and/or random sets of cyclic shifts should be applied to the selected Reference Sequence 405. The Cyclic Shift Selector configures the Cyclic Shifter 406. The Cyclic Shifter 406 performs cyclic shifting of the Reference Sequence 405 (if enabled) to produce Cyclically Shifted Reference Sequence 407.

Reference Sequence(s) selected by the RS selector 402 and/or cyclic shifts (if any) selected by the cyclic shift selector 403 may be performed based on time and/or shared information, such as layer number, frame number, sub-frame offset, slot offset, NodeB identifier (NodeB ID), cell-group ID, UE ID, and/or a pseudo-noise generator seed. The Cyclically Shifted Reference Sequence 407 is passed to the RS Modulator 408, which further alters the Cyclically Shifted Reference Sequence 407 to produce Reference Signal 409. The RS Modulator 408 can be implemented by any modulator, including a modulator implemented in accordance with the Evolved Universal Terrestrial Radio Access (E-UTRA) specification currently being defined by Third Generation Partnership Project (3GPP) Technical Study Group (TSP) Radio Access Networks (RAN) Working Group 1 (WG1), code division multiple access (CDMA), OFDM, OFDMA, DFT-Spread OFDMA, DFT-Spread OFDM, the Institute of Electrical and Electronics Engineers (IEEE) 802.11x family of standards, wideband code division multiple access (WCDMA), time division multiple access (TDMA), and/or any combination thereof. Two different example implementations of the RS Modulator 408 are provided in FIG. 6 and FIG. 7. The Reference Signal 409 can be further adapted for wireless transmission.

The example Reference Signal Generator 501 of FIG. 5 comprises a Reference Sequence Selector 502, a Reference Sequence Generator 504, a Cyclic Shift Selector 503, a Cyclic Shifter 506, and an RS Modulator 508. The example Reference Signal Generator 501 of FIG. 5 operates as follows. The Reference Sequence Selector 502 selects which Reference Sequence is to be transmitted, from one or more predefined, generated, computed and/or random sets of Reference Sequences. The Reference Sequence Selector 502 then configures the Reference Sequence Generator 504, which produces the Reference Sequence 505. The Reference sequence 505 is comprised of one or more elements (e.g., samples, bits and/or values) that are transmitted during a reference signal time period.

The Reference Sequence 505 is passed to the RS Modulator 508 which produces the Modulated RS Sequence 507. The Cyclic Shift Selector 503 selects which cyclic shift (if any) should be applied to the Modulated Reference Sequence 507, from one or more predefined, generated, computed and/or random sets of cyclic shifts. The Cyclic Shift Selector 503 configures the Cyclic Shifter 506. The Cyclic Shifter 506 performs cyclic shifting of the Modulated Reference Sequence 507 (if enabled) to produce the Reference Signal 509. Reference Sequence(s) selected by the RS selector 502 and/or cyclic shifts (if any) selected by the cyclic shift selector 503 may be performed based upon time and/or shared information, such as layer number, frame number, sub-frame offset, slot offset, cell-(group) ID, Node B ID, UE ID, and/or a pseudo-noise generator seed. The RS Modulator 508 can be implemented by any modulator, including a modulator implemented in accordance with the E-UTRA specification currently being defined by 3GPP TSP RAN WG1, CDMA, OFDM, OFDMA, DFT-Spread OFDMA, DFT-Spread OFDM, the IEEE 802.11x family of standards, WCDMA, TDMA, and/or any combination thereof. Two different example implementations of the RS Modulator 508 are provided in FIG. 6 and FIG. 7. The Reference Signal 509 can be further adapted for wireless transmission.

While example RS generators 401 and 501 are illustrated in FIGS. 4 and 5, the RS generators 401 and 501 may be implemented using any number and/or type(s) of alternative and/or additional processors, devices, components, circuits, modules, interfaces, etc. Further, one or more of the processors, devices, components, circuits, modules, elements, interfaces, etc. illustrated in FIGS. 4 and/or 5 may be combined, re-arranged, eliminated and/or implemented in any other way. For example, the example reference signal generator 404 may be omitted and replaced and/or implemented by a memory and/or memory device storing pre-computed and/or pre-loaded reference signals. Moreover, the example RS selectors 402 and 502, the example cyclic shift selectors 403 and 503, the example RS generator 404 and 504, the example cyclic shifter 406 and 506, the example RS modulators 408 and 508 and/or, more generally, the example RS generators 401 and 501 may be implemented as any combination of firmware, software, logic and/or hardware. Moreover, the example RS generators 401 and 501 may include processors, devices, components, circuits, interfaces and/or modules instead of, or in addition to, those illustrated in FIGS. 4 and/or 5, and/or may include more than one of any or all of the illustrated processors, devices, components, circuits, interfaces and/or modules.

Figure 6:
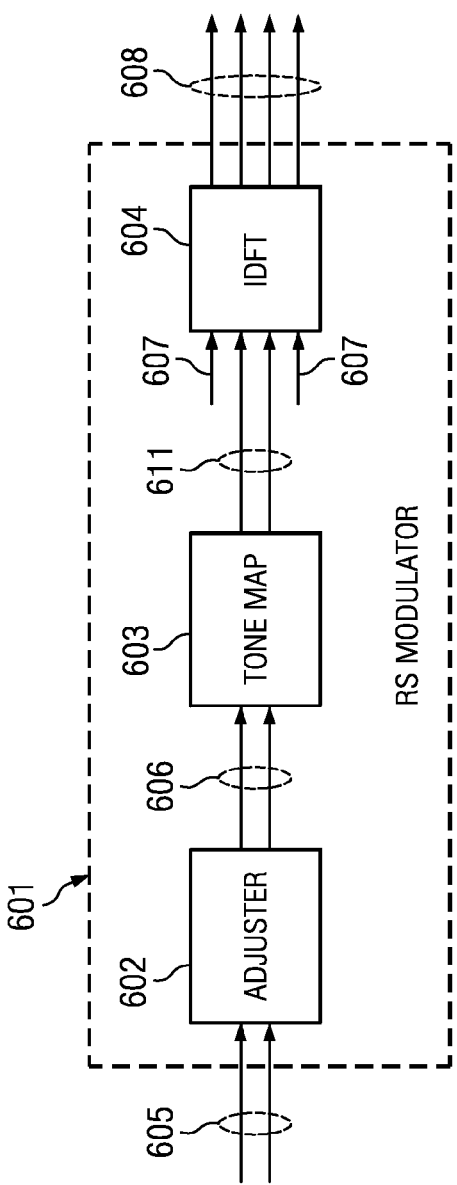
FIG. 6 is a diagram of an example Reference Signal (RS) Modulator.

As stated earlier, the RS Modulator (408 or 508) can be implemented as an OFDM(A) modulator. An example OFDM(A) modulator 601 is shown in FIG. 6. The example RS Modulator 601 of FIG. 6 comprises an Adjuster 602, a Tone Map 603, and an Inverse Discrete Fourier Transform (IDFT) 604. The example RS Modulator 601 of FIG. 6 is provided with Input Samples 605, which can be either the Cyclically Shifted Reference Sequence 407 or the Reference Sequence 505. The RS Modulator 601 operates as follows. The Input Samples 605 may first be adjusted by the Adjuster 602, because the length of the Input Samples may not match the allocated number of tones. The Adjuster 602 may perform any desired processing operation on the Input Samples 605, including, for example, truncation, block-repetition, DFT, permutation, cyclic extension, matrix multiplication, any other operation, and/or a combination thereof.

The Adjusted Samples 606 are then passed to the Tone Map 603, which maps the Adjusted Samples 606 onto a designated set of IDFT input tones 611. The Tone Map can be arbitrary. For example, the Tone Map can be contiguous set of tones (e.g., using every tone starting from tone $w_1$ to tone $w_2$), or the Tone Map can be an evenly-spaced set of tones (e.g., using every V-th tone starting from tone $w_1$ to tone $w_2$). Other signals or zero padding (collectively and/or individually represented in FIG. 6 by 607) can be present at other IDFT inputs. The IDFT then transforms all of its input samples (611 and 607) to produce Output Samples 608, which are output by the RS Modulator 601. The IDFT may be implemented using one or more Fast Fourier Transform (FFT) algorithms.

Figure 7:
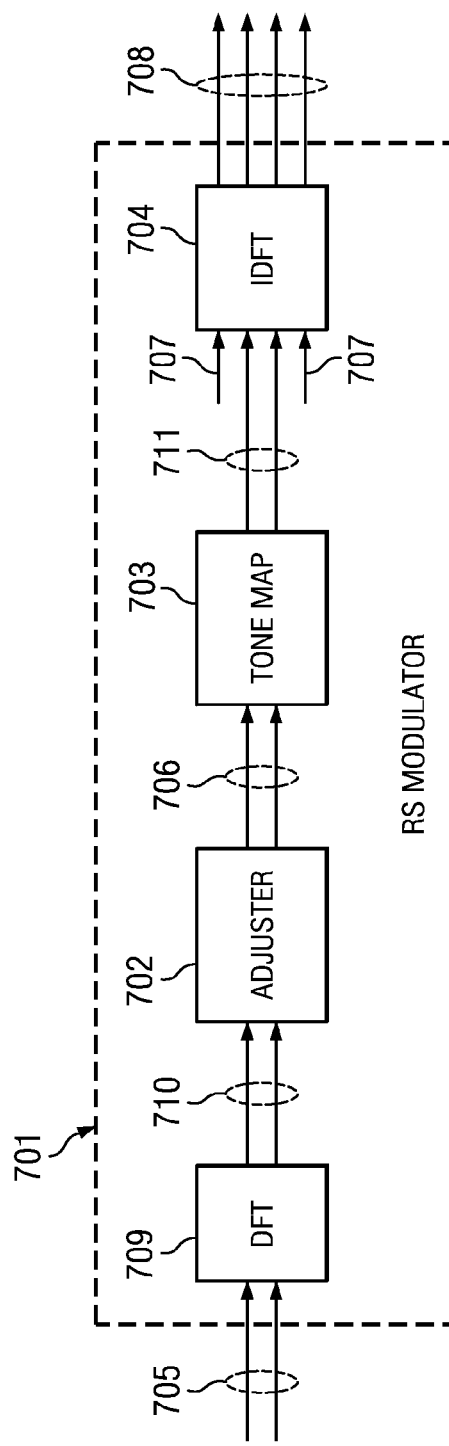
FIG. 7 is a diagram of another example Reference Signal (RS) Modulator.

As stated earlier, the RS Modulator (408 or 508) can be implemented by a DFT-Spread OFDM(A) modulator. An example DFT-Spread OFDM(A) modulator 701 is shown in FIG. 7. The RS Modulator 701 comprises an Adjuster 702, a Tone Map 703, an IDFT 704, and a Discrete Fourier Transform 709. The example RS Modulator 701 is provided with Input Samples 705, which can be either Cyclically Shifted Reference Sequence 407 or Reference Sequence 505. The RS Modulator 701 operates as follows. First, the Input Samples are transformed by the DFT 709 into Transformed Input Samples 710. Transformed Input Samples 710 may then be adjusted by the Adjuster 702, for example, because the length of the Input Samples may not match the allocated number of tones. The Adjuster 702 may perform any operation on the Transformed Input Samples 710, including, for example, truncation, block-repetition, DFT, permutation, cyclic extension, matrix multiplication, any other operation, and/or a combination thereof.

The Adjusted Samples 706 are then passed to the Tone Map 703, which maps the Adjusted Samples 706 onto a designated set of IDFT input tones 711. The Tone Map can be arbitrary. For example, the Tone Map can be a contiguous set of tones (e.g., using every tone starting from tone $w_1$ to tone $w_2$), or the Tone Map can be an evenly-spaced set of tones (e.g., using every V-th tone starting from tone $w_1$ to tone $w_2$). Other signals or zero padding (represented collectively and/or individually by 707) can be present at other IDFT inputs. The IDFT then transforms all of its input samples (711 and 707) to produce Output Samples 708, which are output by the RS Modulator 701. The IDFT operation may be implemented using one or more Fast Fourier Transform (FFT) algorithms. In an alternate example, the operations of the Adjuster 702 and the DFT 709 can be interchanged, (i.e., Input Samples 705 are first adjusted with 702 and then the DFT 709 is applied).

While example RS Modulators 601 and 701 are illustrated in FIGS. 6 and 7, the RS Modulators 601 and 701 may be implemented using any number and/or type(s) of alternative and/or additional processors, devices, components, circuits, modules, interfaces, etc. For example, an RS Modulator 601, 701 may include a controller, a user data interface, a frame, a packetizer, a user data modulator, etc. Further, one or more of the processors, devices, components, circuits, modules, elements, interfaces, etc. illustrated in FIGS. 6 and/or 7 may be combined, re-arranged, eliminated and/or implemented in any other way. Moreover, the example adjusters 602 and 702, the example tone maps 603 and 703, the example IDFTs 604 and 704, the example DFT 709 and/or, more generally, the example RS Modulators 601 and 701 may be implemented as any combination of firmware, software, logic and/or hardware. Moreover, the example RS Modulators 601 and 701 may include processors, devices, components, circuits, interfaces and/or modules instead of, or in addition to, those illustrated in FIGS. 6 and/or 7, and/or may include more than one of any or all of the illustrated processors, devices, components, circuits, interfaces and/or modules.

Some examples utilize CAZAC sequences as the Reference Sequences (405 or 505 or 605 or 705). In a one example, Reference Sequence (405 or 505 or 605 or 705) is constructed from a root constant amplitude zero autocorrelation ("CAZAC") sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and/or others. Thus, in the example, a UE constructs the Reference Sequence from the available set of (N−1) root ZC CAZAC sequences. Cyclic Shifting is performed as follows: for any sequence [c(0) c(1) c(2) ... c(M−1)], a corresponding cyclically shifted sequence is [c(s) c(s+1) c(s+2) ... c(M−1) c(0) c(1) ... c(s−1)], where "s" is the value of the cyclic shift. The Cyclic Shifting is performed by the cyclic shifter (406 or 506).

In an example transmitter, the Reference Sequence Selector 502 (or 402) selects the Reference Sequence 505 (or 405) index "m," and the Cyclic Shift Selector 503 (or 403) selects the Cyclic Shift "s," in accordance with $$m = f(t, x)$$

$$s = g(t, x)$$

Here, "f" and "g" denote functional dependencies. The Reference Sequence 505 can be selected from a collection of ZC CAZAC sequences. In the above equations, "t" is a vector of information ($t_1$, $t_2$, $t_3$, $t_4$, etc.) which directly varies with time. For example, the vector "t" may contain any or all of the layer number, system frame number ($t_1$), the sub-frame offset ($t_2$), slot offset ($t_3$), the transmitted symbol offset ($t_4$), and/or any other additional time-variant information ($t_5$, $t_6$, etc). The time-independent (or time semi-independent, which is slow-varying) information is found in the vector x. For example, the vector "x" ($x_1$, $x_2$, $x_3$, etc.) may contain any or all of cell (or cell-group) ID ($x_1$), the UE (or UE-group) ID ($x_2$), a pseudo-noise generator seed ($x_3$), NodeB ID ($x_4$), and/or any other time-invariant (or time semi-independent) information which is shared between the transmitter and the receiver ($x_5$, etc). For example, this other time-independent information can be IDs of some other UEs in the system (active or not), initial cyclic shift offset, or any other information. In this example, "f" and "g" can be any functions, and each component of described vectors (x, and t) can also be sub-vectors when considered stand-alone. For example, the function f (t, x) may define and/or be implemented by a pseudo-random number generator (e.g. using linear-feedback shift registers).

The shift register is initialized either by all or a portion of a NodeB ID, or by all or a portion of a Cell ID. The shift register is clocked $\alpha_1 t_1 + \alpha_2 t_2 + \alpha_3 t_3$ times (where $\alpha_1, \alpha_2,$ and $\alpha_3$ are any constants), and the final content of the shift register defines and/or maps to an index m used to select and/or generate a Reference Sequence. Likewise, the function g(t, x) may be implemented by a shift register, although with possibly different constants and/or using different inputs. For instance, a pseudo-random permutation generator implementing the function g(t, x) may be initialized and/or offset using a NodeB ID, and/or using $\beta_1 t_1 + \beta_2 t_2 + \beta_3 t_3$ (where $\beta_1$, $\beta_2$ and $\beta_3$ are any constants that may be the same and/or different from the constants $\alpha_1$, $\alpha_2$ and $\alpha_3$). The result of the pseudo-random permutation generator is a permutation that is then applied to one or more pre-sorted Cell IDs that belong to the NodeB, and/or to one or more pre-sorted UE IDs that belong to the NodeB. One or more results of the applied permutation (permuted Cell IDs or permuted UE IDs) are then mapped onto a pre-determined, computed and/or generated set of Cyclic Shifts "s," e.g., "s" is selected from {0, K, 2K, 3K, ..., uK} of possible cyclic shifts and the result of the applied permutation, where K can be any integer. However, the functions f(t, x) and g(t, x) need not be implemented in the same way.

Figure 8:
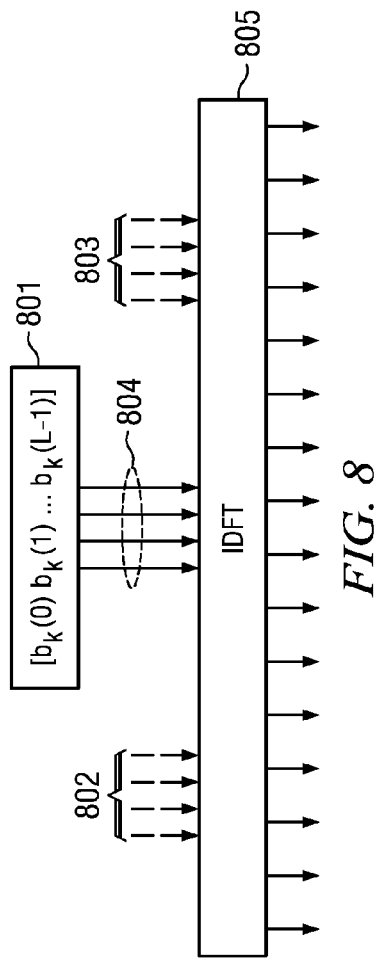
FIG. 8 is a block diagram illustrating a single user equipment (UE) using a single tone block for transmission.

FIG. 8 is a block diagram illustrating a single user equipment (UE) using a single tone block for transmission. When a mobile is allocated only one tone block for an RS symbol, sequences from the base set are used as shown in FIG. 8. Tone block 804 consists of exactly L tones, and thus FIG. 8 also illustrates the concept of a tone block, which was described earlier. The k-th base sequence [bk(0) bk(1) ... bk(L−1)] of length L, shown by 801, is transmitted across the one tone block 804. In some embodiments, the k-th base sequence is also a reference signal sequence. There are a total of K-1 possible base sequences, which are indexed using indexes from k={0, 1, ..., K−1}. Thus, the k-th base sequence 801 is mapped onto the one tone block. This means that the k-th base sequence occupies some inputs to the inverse discrete Fourier transform (IDFT) block 805, as also shown in FIG. 8. Other inputs to the IDFT block are possible and are represented by 802 and 803. These other inputs 802, 803 can be either empty (void, non-existent), can be zeros, can be other signals, or a combination thereof. Outputs of the IDFT block can then be further modulated, as is classic in OFDM based systems or other systems. The IDFT block can be implemented using the inverse fast Fourier transform (IFFT). FIG. 8 thus illustrates a reference signal transmission of one tone block allocation.

Figure 9:
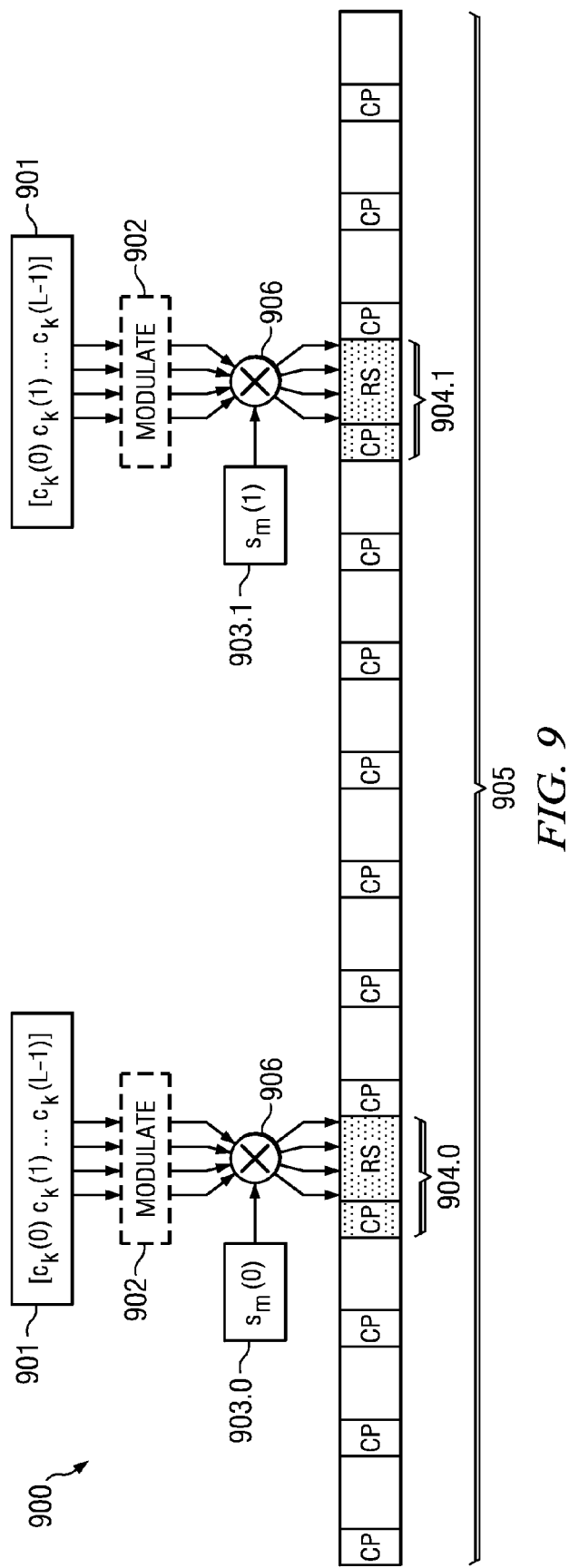
FIG. 9 is a block diagram illustrating generation of the RS using a different orthogonal covering sequence for each transmitter in MIMO operation.

FIG. 9 is a block diagram illustrating generation of the RS using a different orthogonal covering sequence for each transmitter in MIMO operation. To illustrate how block-spreading can be used to separate different transmitters, FIG. 9 illustrates an exemplary time interval 905 containing two distinct RS blocks, namely 904.0 and 904.1. Other blocks can carry data and control, and all blocks are preceded by cyclic-prefix transmission (CP), as common in OFDM-based systems. Two different transmitters which use a common baseline RS sequence [ck(0), ck(1), . . . , ck(L−1)], generated by 901, can be separated using orthogonal block-spreading sequences. For one transmitter, the block-spreading sequence generator 903.0 and 903.1 can generate entries s0=[s0(0), s0(1)]=[+1, +1]. For another transmitter, the corresponding block-spreading sequence generator 903.0 and 903.1 can generate entries using s1=[s1(0), s1(1)]=[+1, −1]. The previous block spreading sequences are the well known Walsh sequences with length 2. The modulator block 902 can be one of the modulators shown in FIG. 6 or 7, for example, but this is not mandatory. The multiplier block 906 in case of Walsh sequences can be a simple sign operator according to the corresponding sign of the Walsh sequence element. In this specific case, the multiplier block 906 only flips the sign bit for the second transmitter in the second RS block. Also, each transmitter can reduce computation by executing 901 and 902 only once per time interval 905.

Note that the length T of the cover sequence depends on the allocation, i.e., it equals the number of allocated tone blocks. In some embodiments of the invention, this is the number of bands. Furthermore, the number of possible covering sequences is denoted by MT for the allocation of T tone blocks. Thus, for every possible allocation of T tone blocks, there is a choice from MT possible covering sequences. This set of all possible covering sequences is the second above mentioned set, i.e., the "covering set." Thus, in order to apply covering as in FIG. 9, sequences from the covering set are selected, where the selected sequence has length T equaling the number of allocated tone blocks. Terms "cover" and "covering" can be used interchangeably.

Some embodiments of CAZAC sequences are ZC sequences. Some embodiments of the invention use CAZAC sequences, e.g., ZC sequences, to construct the base sequences. Some embodiments of the invention use CAZAC sequences, e.g., ZC sequences, to construct to construct the cover sequences. In some embodiments, cover sequences are exactly CAZAC sequences. In some embodiments, base sequences are exactly CAZAC sequences. In other embodiments, CAZAC sequences can be modified to generate cover sequences. In other embodiments, CAZAC sequences can be modified to generate base sequences. In some embodiments, base sequences are found using a computer search, and cover sequences are CAZAC sequences, modified or otherwise (exact). In some embodiments, cover sequences are found using a computer search, and base sequences are CAZAC sequences, modified or otherwise (exact). In other embodiments, both base and cover sequences are found using the computer based search methods. In other embodiments, either base or cover sequences can be generated using linear-feedback-shift registers (LSFR), or using a closed form expression.

In some embodiments, CAZAC sequences are modified to produce base sequences. Some embodiments of this modification can be simple pass-through, which is "no modification". In other embodiments, a CAZAC sequence, which may be prime-length, is cyclically extended by v samples. If a sequence is [a(0) a(1) . . . a(N−1)], then the operation of cyclic extension produces [a(0) a(1) . . . a(N−1) a(0) a(1) . . . a(v−1)], where v is the length of the cyclic extension. Note that cyclic prefixing is also possible instead of cyclic extension. Some embodiments of the CAZAC modification can involve a truncation of a CAZAC sequence. Truncation simply omits some of the sequence elements. Some embodiments of the CAZAC modification involve up-sampling of the CAZAC sequence. In general up-sampling is the insertion of w−1 zeros between each of the sequence elements, where the up-sampling factor is w. For example, if a sequence is [a(0) a(1) . . . a(N−1)], then the operation of up-sampling by w=2 gives [a(0) 0 a(1) 0 a(2) 0 . . . a(N−1) 0]. Other up-sampling factors are possible. In other embodiments, CAZAC modification is accomplished by transforming by a DFT or an IDFT, or by any unitary transformation. In general, CAZAC modification can be any modification or a combination thereof. Thus, the modified CAZAC sequence produces a base sequence.

In some embodiments, CAZAC sequences are modified to produce cover sequences. Some embodiments of this modification can be simple pass-through, which is "no modification". In other embodiments, a CAZAC sequence, which may be prime-length, is cyclically extended by v samples. If a sequence is [a(0) a(1) . . . a(N−1)], then the operation of cyclic extension produces [a(0) a(1) . . . a(N−1) a(0) a(1) . . . a(v−1)], where v is the length of the cyclic extension. Note that cyclic prefixing is also possible instead of cyclic extension. Some embodiments of the CAZAC modification can involve truncation of a CAZAC sequence. Truncation simply omits some of the sequence elements. Some embodiments of the CAZAC modification involve up-sampling of the CAZAC sequence. In general, up-sampling is the insertion of w−1 zeros between each of the sequence elements, where the up-sampling factor is w. For example, if a sequence is [a(0) a(1) . . . a(N−1)], then the operation of up-sampling by w=2 gives [a(0) 0 a(1) 0 a(2) 0 . . . a(N−1) 0]. Other up-sampling factors are possible. In other embodiments, CAZAC modification can be accomplished by transforming by a DFT or an IDFT, or by any unitary transformation. In general, CAZAC modification can be any modification or a combination thereof. Thus, the modified CAZAC sequence produces a cover sequence.

In other embodiments, computer-based search methods can be used to produce either base sequences or cover sequences. In some embodiments, these computer-based search methods can produce sequences which have a low PAPR in the time-domain (after the IDFT). In some embodiments, these search methods can produce sequences which are constant amplitude. When search methods are used, sequences are typically stored in memory and read when necessary. One benefit of the proposed sequence construction method is that when both base and cover sequences have low PAPR (in time-domain, after IDFT), the resultant time domain transmission will also be a low-PAPR transmission. This can increase cell coverage, for example. Thus, such proposed RS generation can be applied in general, but becomes especially useful when the data is SC-OFDMA modulated (for example, via DFT-spread OFDM), and is TDM multiplexed with the reference signal. However, the RS construction method can be applied and can bring benefits more generally.

In some embodiments, special provisions can be made for two tone blocks, and a special sequence set can be designed for those allocations. In other embodiments, the allocation of two tone blocks is treated as any other allocation, and the transmitter diagram is described as above. In some embodiments, time-domain cyclic shifts of the resultant transmission can be used to multiplex different users. Thus, different users can have the same base sequence and the cover sequence, but they are allocated different time-domain cyclic shifts, which can be implemented after the IDFT, in the transmitter diagram. Both "sequence hopping" and "cyclic shift hopping" are possible with the described RS sequence construction. With sequence hopping, or cyclic shift hopping, selection of the sequence (both cover and base), and of the cyclic shift, is implicit through the information shared by the transmitter and the receiver.

Sequence planning is also possible with the described RS sequence construction. With sequence planning, network topology is used to allocate different sequences to adjacent cells. Combinations of hopping and planning are possible. In some embodiments, base sequences are used for cell planning and cover sequences are used for hopping. In some embodiments, if $z[k]$ are inputs to the IDFT, then baseband time-domain signal is the sum of $z[k] \exp[j 2\pi (\tau-\tau 0) k \Delta f]$ over all inputs k. Here, $\tau$ is continuous time, $\tau 0$ is cyclic prefix duration, $\Delta f$ is tone spacing, and j is imaginary unit. Thus, in some embodiments, IDFT can be skipped and the equivalent operation performed by adding $z[k] \exp[j 2\pi (\tau-\tau 0) k \Delta f]$ over all k.

In order to enable SU-MIMO transmission, in some embodiments of the invention, a UE can be assigned more than one (e.g. a group) of DMRS resources. In some embodiments, a DMRS resource is obtained from a cyclic shift of a base signal. The number of cyclic shifts used is signaled to the UE. In some embodiments of the invention, a UE uses a group of evenly spaced cyclic shifts. In some embodiments of the invention, a NodeB signals only one cyclic shift to the UE and the remaining cyclic shifts are computed at the UE using the single signaled cyclic shift. In other embodiments, all cyclic shifts which are assigned to the UE are signaled explicitly in the downlink signaling. Thus, in some embodiments of the invention, reference signal resources are cyclic shifts.

In some embodiments of the invention, the DMRS is pre-coded by one pre-coder and data transmission is pre-coded by another pre-coder. In some embodiments of the invention, both pre-coders are the same. In some embodiments of the invention, the pre-coders are different. Further, in some embodiments, the DMRS is not pre-coded and the data transmission is pre-coded.

In one or more embodiments of the invention, the number of assigned reference signal resources is based on the number of layers used for transmission, i.e., the number of layers used in a MIMO transmission. In some embodiments of the invention, the number of reference signal resources is the same as the number of layers in the transmission. In some embodiments of the invention, the number of reference signal resources and the number of layers are derived from a common parameter, which can be a number of DMRS resources, a number of layers, or an auxiliary signaled (group of) parameter(s).

In one or more embodiments of the invention, the number of assigned reference signal resources is based on the maximum possible number of layers in a MIMO transmission. In some embodiments of the invention, the number of assigned DMRS resources is same as the maximum possible number of layers. In some embodiments of the invention, the number of reference signal resources and the maximum number of layers are derived from a common parameter, which can be the number of DMRS resources, the maximum number of layers, or an auxiliary (group of) parameter(s).

In one or more embodiments of the invention, the number of assigned reference signal resources is based on the number of DMRS cyclic shifts. To accommodate up to 4-layer transmission per UE, two distinct cyclic shifts per UE may be assigned by employing length-2 sequence covering across the two DMRS symbols within one subframe. This offers up to 4 DMRS resources to accommodate up to 4-layer transmission. An example of the length-2 sequence covering {(x1(0), x1(1)), (x2(0), x2(1))} is based on the set {(+1, +1), (+1, −1)}. Other length-2 sequences are also possible. Here, xn(0) multiplies the first DMRS symbol in the first slot and xn(1) multiplies the second DMRS symbol in the second slot.

An exemplary arrangement of the resources is as follows for up to 4-layer transmission: layer 0 is assigned the first cyclic shift (CS) with sequence x1=(x1(0), x1(1)); layer 1 is assigned the second cyclic shift (CS) with sequence x1=(x1(0), x1(1)); layer 2 is assigned the first cyclic shift (CS) with sequence x2=(x2(0), x2(1)); and layer 3 is assigned the second cyclic shift (CS) with sequence x2=(x2(0), x2(1)).

Another exemplary arrangement of the resources is as follows for up to 4-layer transmission: layer 0 is assigned the first CS with sequence x1; layer 1 is assigned the first CS with sequence x2; layer 2 is assigned the second CS with sequence x1; and layer 3 is assigned the second CS with sequence x2.

The above arrangements are applicable for any codeword-to-layer mapping scheme, e.g., single codeword, one codeword per layer (PARC), maximum of two codewords (PGRC). When applied for the mapping with a maximum of two codewords (which is used for the downlink SU-MIMO), the codeword-to-layer mapping CWx depends on the number of transmission layers. If there is one transmission layer, CW0 maps to layer 0. If there are two transmission layers, CW0 maps to layer 0 and CW1 maps to layer 1 (with a secondary mode of single codeword, CW0 maps to both layer 0 and layer 1). If there are three transmission layers, CW0 maps to layer 0 and CW1 maps to layer 1 and layer 2. If there are four transmission layers, CW0 maps to layer 0 and layer 1 and CW1 maps to layer 2 and layer 3.

With the above codeword-to-layer mapping, another exemplary arrangement of the resources for up to 4-layer transmission is as follows. If there is one transmission layer, CW0 is assigned the first CS and x1 maps to layer 0 (x1). If there are two transmission layers, CW0 is assigned the first CS and x1 maps to layer 0 (x1). Further, CW1 is assigned the second CS and x1 maps to layer 1 (x1). If there are two transmission layers with the secondary mode, CW0 is assigned the first CS and {x1, x2} maps to both layer 0 (x1) and layer 1 (x2). If there are three layers of transmission, CW0 is assigned the first CS and x1 maps to layer 0. Further, CW1 is assigned the second CS and {x1, x2} maps to both layer 1 (x1) and layer 2 (x2). If there are four layers of transmission, CW0 is assigned the first CS and {x1, x2} maps to both layer 0 (x1), and layer 1 (x2). Further, CW1 is assigned the second CS and {x1, x2} maps to both layer 2 (x1) and layer 3 (x2).

Note that any permutative variation of the CS and sequence assignments may also be used. For example, another exemplary arrangement of the resources is as follows. For one layer of transmission, CW0 is assigned the first CS and x1 maps to layer 0 (x1). If there are two layers of transmission, CW0 is assigned the first CS and x1 maps to layer 0 (x1). Further, CW1 is assigned the second CS and x2 maps to layer 1 (x2). If there are two transmission layers with the secondary mode, CW0 is assigned the first CS and {x1, x2} maps to both layer 0 (x1) and layer 1 (x2). If there are three layers of transmission, CW0 is assigned the first CS and x1 maps to layer 0 (x1). Further, CW1 is assigned the second CS and {x1, x2} maps to layer 1 (x2) and layer 2 (x1). If there are four layers of transmission, CW0 is assigned the first CS and {x1, x2} map to layer 0 (x1) and layer 1 (x2). Further, CW1 is assigned the second CS and {x1, x2} map to layer 2 (x2) and layer 3 (x1).

While the plurality of sequences can be used to increase (double in the above example) the total number of DMRS resources and thus assigned to different UEs, in some embodiments of the invention, sequence covering (multiple sequences) is used in only one UE for the support of multiple layers. In such embodiments, cyclic shift resources are used to differentiate among UEs. However, in other embodiments, different UEs can be differentiated by different covering sequences.

In various embodiments of the invention, the cyclic shifts can be allocated semi-statically, dynamically, or any combination of semi-static and dynamic allocation. In some embodiments of the invention, the dynamic part of the cyclic shift assignment is incorporated into the UL grant. In this case, several alternatives are possible depending on the number of transmission layers and the DRMS resource arrangement (cyclic shift and sequence—although only the cyclic shift is assigned dynamically across UEs. In one alternative, the length of the DMRS cyclic shift field is varied depending on the number layers (hence the number of cyclic shifts. In another alternative, the length of the DMRS cyclic shift field is fixed in the UL grant regardless of the number of transmission layers. This alternative avoids an increase in the number of blind decodes. If only one DMRS cyclic shift is assigned, the value can be repeated twice to attain the desired length.

The DMRS cyclic shift assignment is based on the PHICH (physical information channel carrying DL ACK/NAKs) resource assignment (PHICH group and sequence pair). In one or more embodiments of the invention, when the number of DMRS cyclic shift resources is larger than the number of DL ACK/NAKs per UE, the PHICH resource assignment is based on a subset of the assigned DMRS cyclic shifts (e.g., the first few/smallest cyclic shifts). This scenario includes: 1) single-codeword layer mapping with up to 2 or 4 cyclic shifts (see above) with only one DL ACK/NAK per UE; and 2) 4-Tx layer mapping using a maximum of two codewords with up to two or four cyclic shifts where the two codewords share the same MCS and HARQ process with only one DL ACK/NAK per UE. In some embodiments of the invention, when the number of DMRS cyclic shift resources is the same as the number of DL ACK/NAKs per UE, the PHICH resource assignment is based on the assigned DMRS cyclic shifts. This scenario includes: 1) 4-Tx layer mapping using a maximum of two codewords with up to two cyclic shifts where the two codewords share the same MCS and HARQ process and two DL ACK/NAKs per UE (one DL ACK/NAK per codeword) are needed; and 2) 2-Tx layer mapping using a maximum of two codewords with up to two cyclic shifts, one cyclic shift per codeword. For a given codeword in the 4-Tx layer mapping, the PHICH resource is associated with the assigned DMRS cyclic shift for that particular codeword. Note that the sequence assignment is based on a predetermined arrangement rule (see above examples).

In some embodiments of the invention, a symbol or a fraction of a symbol which is normally used for data transmission could be borrowed to enable SU-MIMO transmission. In such embodiments, assignment of cyclic shifts can be as described above.

Figure 10:
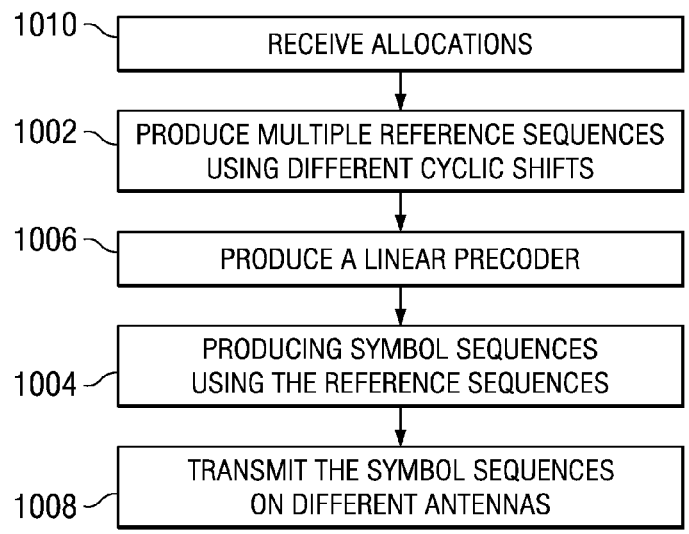
FIG. 10 is a flow diagram illustrating operation of MIMO transmission in which multiple DMRS signals are produced by a UE.

FIG. 10 is a flow diagram illustrating operation of MIMO transmission in which multiple DMRS signals are produced by a UE. The UE produces 1002 a first RS s1[k] using a first cyclic shift and a base sequence s0[k], wherein k={1, 2 ... K} is an element index. When two layers are being used, it also produces 1002 a second RS s2[k] using a second cyclic shift and s0[k]. When four layers are being used, two additional DMRS are produced using s1[k] and s2[k], respectively. These reference signals may be produced using CAZAC-like sequences, as described in more detail with regard to FIGS. 5 and 6, for example.

In some embodiments, s1[k] is produced by s0[k]*exp(j*u1*k), and s2[k] is produced by s0[k]*exp(j*u2*k). In another embodiment, s1[k] is produced by s0[k]*exp(j*u1*k), and s2[k] is produced by −s0[k]*exp(j*u2*k). In another embodiment, s2[k] is produced by s0[k]*exp(j*u2*k) for a first transmission duration and s2[k] is produced by −s0[k]*exp(j*u2*k) for a second transmission duration.

u1 and u2 may be cyclic shift values that are stored on the UE, or they may be received by the UE during or just prior to transmitting. In another embodiment, the UE may receive 1010 u1 and calculate u2 based on u1. u1 and u2 may be specific integer values, or may be calculated from a defined function.

Once the reference sequences are produced, symbol sequences are produced using the reference sequences 1004. A first symbol sequence x1[k] is produced 1004 using at least s1[k] and s2[k], for at least one k; and a second symbol sequence x2[k] is produced 1004 using at least s1[k] and s2[k], for at least one k. Note while that x1[k] and x2[k] may both be produced using s1[k] and s2[k], x1[k] and x2[k] are not necessarily identical. For example, x1[k] may be produced as s1[k]+s2[k] and x2[k] may be produced as s1[k]+j*s2[k]. The symbol sequences may be produced as described in more detail with regard to FIGS. 6-9.

In some embodiments, a linear precoder Q of size M×N is produced 1006, wherein M is a number of transmitters and N is a number of receivers, and wherein N is at least 2. Producing 1004 x1[k] then involves transforming at least {s1[k], s2[k]} with Q to produce x1[k]. The precoder matrix is produced as described in more detail with regards to Table 1 and Table 2.

x1[k] is transmitted 1008 using a first transmit antenna, and x2[k] is transmitted using a second transmit antenna.

In some embodiments, a third RS s3[k]=s1[k] and a fourth RS s4[k]=s2[k] is produced 1002. A third symbol sequence x3[k] is produced 1004 using at least {s1[k], s2[k], s3[k], s4[k]} for at least one k. A fourth symbol sequence x4[k] is produced 1004 using at least {s1[k], s2[k], s3[k], s4[k]} for at least one k. x3[k] is transmitted 1008 using a third transmit antenna, and x4[k] is transmitted 1008 using a fourth transmit antenna. In another embodiment, the third RS s3[k]=−s1[k] and the fourth RS s4[k]=−s2[k]. In another embodiment, RS s3[k]=s1[k] and RS s3[k]=s2[k] for a first transmission duration, and RS s3[k]=−s1[k] and RS s4[k]=−s2[k] for a second transmission duration. In some of these embodiments, a linear pre-coder Q of size M×N may be produced 1006, wherein N is at least 4. Producing x3[k] is produced 1004 by transforming at least {s1[k], s2[k], s3[k], s4[k]} with Q to produce x3[k].

In some embodiments, a physical uplink shared channel (PUSCH) allocation may be received 1010, a PUSCH data signal may be produced 1004 using the pre-coder Q 1006; and the PUSCH data signal may then be transmitted 1008.

System Examples

Figure 11:
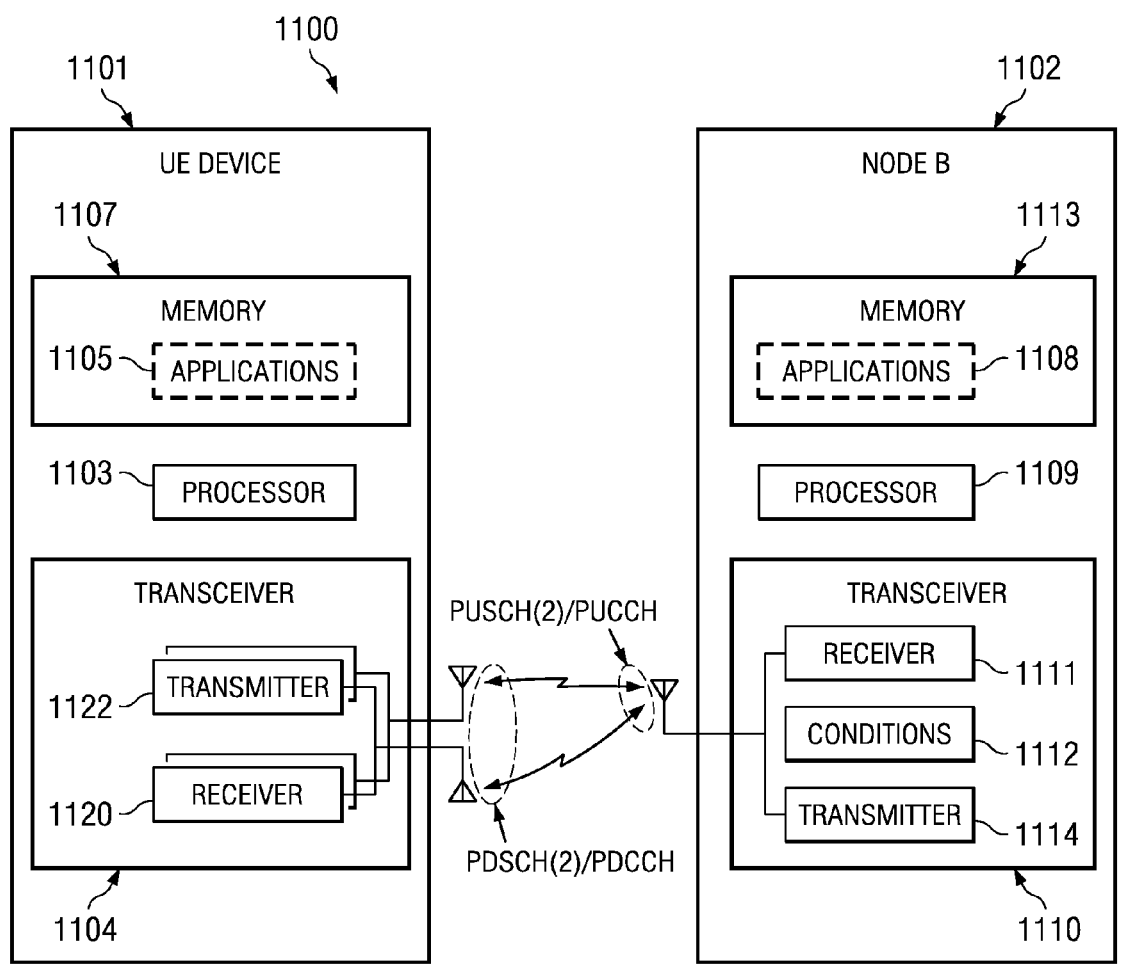
FIG. 11 is a block diagram illustrating a UE and NodeB for the network system of FIG. 1.

FIG. 11 is a block diagram illustrating the network system of FIG. 1. As shown in FIG. 11, the wireless networking system 1100 includes a mobile UE device 1101 in communication with an eNB 1102. The mobile UE device 1101 may represent any of a variety of devices such as a server, a desktop computer, a laptop computer, a cellular phone, a Personal Digital Assistant (PDA), a smart phone or other electronic devices. In some embodiments, the electronic mobile UE device 1101 communicates with the eNB 1102 based on a LTE or E-UTRA protocol. Alternatively, another communication protocol now known or later developed can be used.

As shown, the mobile UE device 1101 includes a processor 1103 coupled to a memory 1107 and a Transceiver 1104. The memory 1107 stores (software) applications 1105 for execution by the processor 1103. The applications 1105 could be any known or future application useful for individuals or organizations. As an example, such applications 1105 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 1105, at least some of the applications 1105 may direct eNB (base-station) 1102 to transmit DL signals to mobile UE device 1101 periodically or continuously via the transceiver 1104.

Transceiver 1104 includes uplink logic which may be implemented by execution of instructions that control the operation of the transceiver. Some of these instructions may be stored in memory 1107 and executed when needed. As would be understood by one of skill in the art, the components of the Uplink Logic may involve the physical (PHY) layer and/or the Media Access Control (MAC) layer of the transceiver 1104. Transceiver 1104 includes two or more receivers 1120 and two or more transmitters 1122.

eNB 1102 includes a Processor 1109 coupled to a memory 1113 and a transceiver 1110. Memory 1113 stores applications 1108 for execution by the processor 1109. The applications 1108 could be any known or future application useful for managing wireless communications. At least some of the applications 1108 may direct the base-station to manage transmissions to or from the user device 1101.

Transceiver 1110 includes an uplink resource manager which enables eNB 1102 to selectively allocate uplink PUSCH resources to the user device 1101. As would be understood by one of skill in the art, the components of the uplink resource manager 1112 may involve the physical (PHY) layer and/or the Media Access Control (MAC) layer of the transceiver 1110. Transceiver 1110 includes a Receiver 1111 for receiving transmissions from various UE within range of the eNB and transmitter 1114 for transmission to the various UE within range. The uplink resource manager executes instructions that control the operation of transceiver 1110. Some of these instructions may be located in memory 1113 and executed when needed. The resource manager controls the transmission resources allocated to each UE that is being served by eNB 1102 and broadcasts control information via the physical downlink control channel PDCCH.

During MIMO transmission from eNB 1102 via transmitters 1114 on PDSCH, eNB 1102 monitors channel conditions to adapt to the prevailing condition. This includes monitoring the channel quality indicator (CQI) feedback provided by UE 1101 on the uplink channel using condition monitoring logic 1112 that is coupled to receiver 1111.

During MIMO transmission from UE 1101 via transmitters 1122 on PUSCH, UE 1101 forms DMRS signals using different amounts of cyclic shift, depending on the number of layers being used for transmission, as described in more detail above.

A typical eNB will have multiple sets of receivers and transmitters which operate generally as described herein to support hundreds or thousand of UE within a given cell. Each transmitter may be embodied generally by a processor 1109 that executes instructions from memory 1113 to perform the scrambling, mapping, and OFDM signal formation, using signal processing techniques as are generally known in the art.

Other Embodiments

While the invention has been described with reference to illustrative embodiments, this description is not intended to be construed in a limiting sense. Various other embodiments of the invention will be apparent to persons skilled in the art upon reference to this description.

While described herein with reference to downlink transmission, an embodiment of the invention may be applied to uplink as well where multi-antenna uplink transmission is supported.

An embodiment may transmit using fixed precoding when the transmitted signal includes multiple spatial layers and transmit using transmit diversity when the transmitted signal includes a single layer.

Embodiments of this invention apply to any flavor of frequency division multiplex based transmission. Thus, the concept can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

As described in general above, embodiment of the invention may perform all tasks described herein such as channel monitoring and preceding selection, formation of transmission signals, etc, using logic implemented by instructions executed on a processor. Another embodiment may have particular hardwired circuitry or other special purpose logic optimized for performing one or more to the tasks described herein.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method for transmitting a plurality of reference sequences (RS) from a UE, the method comprising:
producing a first RS s1[k] using a first cyclic shift and a base sequence s0[k], wherein k={1, 2 ... K} is an element index;
producing a second RS s2[k] using a second cyclic shift and s0[k];
producing a first symbol sequence x1[k] using at least s1[k] and s2[k], for at least one k;
producing a second symbol sequence x2[k] using at least s1[k] and s2[k], for at least one k;
transmitting x1[k] using a first transmit antenna; and
transmitting x2[k] using a second transmit antenna.

2. The method of claim 1, wherein s1[k] is produced by s0[k]*exp(j*u1*k), and wherein s2[k] is produced by s0[k]*exp(j*u2k), wherein u1 is calculated from a first function and u2 is calculated from a second function.

3. The method of claim 2, wherein u1 is the first cyclic shift and u2 is the second cyclic shift.

4. The method of claim 1, wherein producing x1[k] comprises:
producing a linear precoder Q of size M×N, wherein M is an integer number of transmitters and N is an integer number of receivers, wherein N is at least 2 and M is at least 2; and
transforming at least {s1[k], s2[k]} with Q to produce x1[k].

5. The method of claim 2, further comprising:
receiving u1; and
receiving u2.

6. The method of claim 2, further comprising:
receiving u1; and
producing u2 using u1.

7. The method of claim 6, wherein u2 is produced using u1 and N, wherein N is an integer number of receivers, and wherein N is at least 2.

8. The method of claim 4, further comprising:
receiving a physical uplink shared channel (PUSCH) allocation;
producing a PUSCH data signal using the pre-coder Q; and
transmitting the PUSCH data signal.

9. The method of claim 1, further comprising
producing a third RS s3[k]=s1[k];
producing a fourth RS s4[k]=s2[k];
producing a third symbol sequence x3[k] using at least {s1[k], s2[k], s3[k], s4[k]} for at least one k;
producing a fourth symbol sequence x4[k] using at least {s1[k], s2[k], s3[k], s4[k]} for at least one k;
transmitting x3[k] using a third transmit antenna; and
transmitting x4[k] using a fourth transmit antenna.

10. The method of claim 1, further comprising
producing a third RS s3[k]=−s1[k];
producing a fourth RS s4[k]=−s2[k];
producing x3[k] using at least {s1[k], s2[k], s3[k], s4[k]} for at least one k;
producing x4[k] using at least {s1[k], s2[k], s3[k], s4[k]} for at least one k;
transmitting x3[k] using a third transmit antenna; and
transmitting x4[k] using a fourth transmit antenna.

11. The method of claim 9, wherein RS s3[k]=s1[k] and RS s3[k]=s2[k] for a first transmission duration, and RS s3[k]=−s1[k] and RS s4[k]−s2[k] for a second transmission duration.

12. The method of claim 9, wherein producing x3[k] comprises:
producing a linear pre-coder Q of size M×N, wherein M is an integer number of transmitters and N is an integer number of receivers, wherein N is at least 4 and M is at least 2; and
transforming at least {s1[k], s2[k], s3[k], s4[k]} with Q to produce x3[k].

13. The method of claim 1, wherein s1[k] is produced by s0[k]*exp(j*u1*k), and wherein s2[k] is produced by −s0[k]*exp(j*u2*k), wherein u1 is calculated from a first function and u2 is calculated from a second function.

14. The method of claim 2, wherein s2[k] is produced by s0[k]*exp(j*u2*k) for a first transmission duration and s2[k] is produced by −s0[k]*exp(j*u2*k) for a second transmission duration.

15. Apparatus for transmitting with multiple antennas, comprising:
processing logic operable to determine a base sequence and a plurality of cyclic shift values; and
transmission logic coupled to the processing logic and to multiple antennas, the transmission logic operable to form a transmission signal for transmission by the multiple antennas using the base sequence and the plurality cyclic shift values, wherein the transmission logic is operable to form a transmission signal for transmission by:
producing a first RS s1[k] using a first cyclic shift and a base sequence s0[k], wherein k={1, 2 ... K} is an element index;
producing a second RS s2[k] using a second cyclic shift and s0[k];
producing a first symbol sequence x1[k] using at least s1[k] and s2[k], for at least one k;
producing a second symbol sequence x2[k] using at least s1[k] and s2[k], for at least one k;
transmitting x1[k] using a first transmit antenna of the multiple antennas; and
transmitting x2[k] using a second transmit antenna of the multiple antennas.

16. The apparatus of claim 15, wherein producing x1[k] comprises:
producing a linear precoder Q of size M×N, wherein M is an integer number of transmitters and N is an integer number of receivers, wherein N is at least 2 and M is at least 2; and
transforming at least {s1[k], s2[k]} with Q to produce x1[k].

17. The apparatus of claim 15, further comprising receiving logic operable to receive the first cyclic shift value.

18. The apparatus of claim 15, wherein the transmission logic is further operable to form a transmission signal by:
producing a third RS s3[k]=s1[k];
producing a fourth RS s4[k]=s2[k];
producing x3[k] using at least {s1[k], s2[k], s3[k], s4[k]} for at least one k;
producing x4[k] using at least {s1[k], s2[k], s3[k], s4[k]} for at least one k;
transmitting x3[k] using a third transmit antenna of the multiple antennas; and transmitting x4[k] using a fourth transmit antenna of the multiple antennas.

19. The apparatus of claim 15, wherein s1[k] is produced by s0[k]*exp(j*u1*k), and wherein s2[k] is produced by s0[k]*exp(j*u2*k), wherein u1 is the first cyclic shift and u2 is the second cyclic shift.

20. The apparatus of claim 19, wherein the transmission logic is operable to form a transmission signal by producing s2[k]=s0[k]*exp(j*u2*k) for a first transmission duration and producing s2[k]=−s0[k]*exp(j*u2*k) for a second transmission duration.

* * * * *